United States Patent
Jedamzik et al.

(10) Patent No.: US 11,698,577 B2
(45) Date of Patent: Jul. 11, 2023

(54) IMAGING SYSTEM COMPRISING BEAM GUIDANCE ELEMENT WITH HIGH SOLARIZATION RESISTANCE IN THE VISIBLE SPECTRAL RANGE

(71) Applicant: Schott AG, Mainz (DE)

(72) Inventors: Ralf Jedamzik, Griesheim (DE); Peter Naß, Mainz (DE); Sebastian Leukel, Mainz (DE); Volker Hagemann, Nieder-Olm (DE); Uwe Petzold, Osthofen (DE)

(73) Assignee: Schott AG, Mainz (DE)

( * ) Notice: Subject to any disclaimer, the term of this patent is extended or adjusted under 35 U.S.C. 154(b) by 216 days.

(21) Appl. No.: 17/333,621

(22) Filed: May 28, 2021

(65) Prior Publication Data

US 2021/0373426 A1    Dec. 2, 2021

(51) Int. Cl.
*G03B 21/20* (2006.01)

(52) U.S. Cl.
CPC ................. *G03B 21/2033* (2013.01)

(58) Field of Classification Search
None
See application file for complete search history.

(56) References Cited

U.S. PATENT DOCUMENTS

| 5,925,468 | A | 7/1999 | Stewart |
| 7,217,673 | B2 | 5/2007 | Naumann et al. |
| 7,976,174 | B2 | 7/2011 | Zimmermann |
| 7,988,305 | B2 | 8/2011 | Itoh et al. |
| 2006/0205583 | A1* | 9/2006 | Naumann ............... C03C 3/091 501/66 |
| 2007/0165685 | A1 | 7/2007 | Mizuuchi et al. |
| 2018/0136446 | A1 | 5/2018 | Werley et al. |

FOREIGN PATENT DOCUMENTS

| JP | 7-213077 A | 8/1995 |
| JP | 2012-36091 A | 2/2012 |

OTHER PUBLICATIONS

Belgium Search Report dated Oct. 5, 2021 for Belgium Patent Application No. 85898BE00 (15 pages).
"Optical Glass Data Sheet", Schott AG, Germany, May 2019 (129 pages).
German Office Action dated Jan. 19, 2021 for German Application No. 10 2020 114 365.6 (7 pages).

* cited by examiner

*Primary Examiner* — Sultan Chowdhury
*Assistant Examiner* — Danell L Owens
(74) *Attorney, Agent, or Firm* — Taylor IP, P.C.

(57) ABSTRACT

An imaging system includes at least one laser light source having a wavelength in the visible spectral range and a beam guidance element with high solarization resistance at high beam power densities. The invention also relates to the use of the imaging system, in particular in projectors and in material processing.

14 Claims, 2 Drawing Sheets

IMAGING SYSTEM COMPRISING BEAM GUIDANCE ELEMENT WITH HIGH SOLARIZATION RESISTANCE IN THE VISIBLE SPECTRAL RANGE

CROSS REFERENCE TO RELATED APPLICATIONS

This application claims priority to Germany Patent Application No. DE 10 2020 114 365.6 filed on May 28, 2020, which is incorporated in its entirety herein by reference.

BACKGROUND OF THE INVENTION

1. Field of the Invention

The present invention relates to an imaging system including at least one laser light source having a wavelength in the visible spectral range and a beam guidance element with high solarization resistance at high beam power densities. The invention also relates to the use of the imaging system, in particularly in projectors and in material processing.

2. Description of the Related Art

Light sources for projectors are currently experiencing a change from xenon to luminescent laser substances and pure RGB laser sources with constantly increasing luminous fluxes and power densities. Today's cinema projectors with laser sources achieve, for example, a luminous flux of up to 75,000 lumen and surface power densities of up to 50 W/cm$^2$ or more. With the increasing light fluxes and power densities the thermal load of optical components increases, by which the quality of the projection and the long-term stability are compromised. The optical system of a cinema projector normally consists of a large-volume arrangement of prisms and a projection objective lens. In particularly, the arrangement of prisms is subjected to a high thermal load. Therefore, the requirements for optical glasses with respect to low absorption losses, that is, maximum transmission and low tendency to solarization, that is, low induced absorption losses in the application, constantly increase.

Traditional xenon-based cinema projectors have maximum light fluxes of up to 45,000 lumen. In up-to-date laser-based projectors, however, light fluxes of up to 75,000 lumen and surface power densities of up to 50 W/cm$^2$ or more are achieved. A strong blue laser excites the emission of yellow light in a converter. The green and yellow channels are extracted from the yellow light with the help of dichroitic filters. A part of the blue light is used for the blue channel. Then, all three channels are used for the projection.

The projection system often consists of a complex arrangement of prisms for guiding the single color channels to the DLP chips and mixing the signals for image generation. The optical path length may be more than 100 to 200 mm. Any light absorption within the arrangement of prisms leads to temperature gradients and thermal lens effects. Therefore, the prism glass should have a transmission in the visible wavelength range which is as high as possible. Further effects which with the increasing light fluxes of the projectors are becoming more important are solarization effects in the glass. Absorption-induced generation of defect centers in the prism glass may result in a reduction of the transmission which in turn is concomitant with thermal lens effects.

However, such solarization effects are not only relevant in optical systems of up-to-date projectors. Also in the case of material processing applications such phenomena are playing an increasing role.

SUMMARY OF THE INVENTION

Exemplary embodiments provided according to the present invention provide imaging systems with beam guidance elements which are characterized by a high solarization resistance in the visible spectral range, in particularly in the blue spectral range, and therefore excellently can be used in projectors, but also in the case of material processing applications.

In some exemplary embodiments provided according to the present invention, an imaging system includes: at least one laser light source selected from the group consisting of a laser light source B having a wavelength in the spectral range of 380 nm to 490 nm, a laser light source G having a wavelength $\lambda_B$ in the spectral range of >490 nm to 585 nm, and a laser light source R having a wavelength $\lambda_R$ in the spectral range of >585 nm to 750 nm; and a beam guidance element. The laser light source is suitable to generate in at least one point of the beam guidance element a mean surface power density of more than 10 W/cm$^2$, and the beam guidance element consists of a glass having a quality factor $F(436 \text{ nm}) = S(436 \text{ nm}) * (Ext_0(436 \text{ nm}) + Ext_1(436 \text{ nm}))/k$, where $S(436 \text{ nm})$ is a thermality at a wavelength of 436 nm, $Ext_1(436 \text{ nm})$ is an additional absorbance in comparison to $Ext_0(436 \text{ nm})$ at a wavelength of 436 nm of a sample having a thickness of 10 mm after an irradiation of 15 hours with a HOK 4 lamp, $Ext_0(436 \text{ nm})$ is an absorbance at a wavelength of 436 nm of a sample having a thickness of 10 mm without irradiation with a HOK 4 lamp, and k is a thermal conductivity, and $F(436 \text{ nm})$ is <700 ppm/W.

In some exemplary embodiments provided according to the present invention, a beam guidance element consists of a glass having a quality factor $F(436 \text{ nm}) = S(436 \text{ nm}) * (Ext_0(436 \text{ nm}) + Ext_1(436 \text{ nm}))/k$, where $S(436 \text{ nm})$ is a thermality at a wavelength of 436 nm, $Ext_1(436 \text{ nm})$ is an additional absorbance in comparison to $Ext_0(436 \text{ nm})$ at a wavelength of 436 nm of a sample having a thickness of 10 mm after an irradiation of 15 hours with a HOK 4 lamp, $Ext_0(436 \text{ nm})$ is an absorbance at a wavelength of 436 nm of a sample having a thickness of 10 mm without irradiation with a HOK 4 lamp, and k is a thermal conductivity, and $F(436 \text{ nm})$ is <700 ppm/W.

In some exemplary embodiments provided according to the present invention, a glass is provided that has a quality factor $F(436 \text{ nm}) = S(436 \text{ nm}) * (Ext_0(436 \text{ nm}) + Ext_1(436 \text{ nm}))/k$, where $S(436 \text{ nm})$ is a thermality at a wavelength of 436 nm, $Ext_1(436 \text{ nm})$ is an additional absorbance in comparison to $Ext_0(436 \text{ nm})$ at a wavelength of 436 nm of a sample having a thickness of 10 mm after an irradiation of 15 hours with a HOK 4 lamp, $Ext_0(436 \text{ nm})$ is an absorbance at a wavelength of 436 nm of a sample having a thickness of 10 mm without irradiation with a HOK 4 lamp, and k is a thermal conductivity, and $F(436 \text{ nm})$ is <700 ppm/W.

In some exemplary embodiments provided according to the present invention, a projector includes an imaging system. The imaging system includes: at least one laser light source selected from the group consisting of a laser light source B having a wavelength in the spectral range of 380 nm to 490 nm, a laser light source G having a wavelength $\lambda_G$ in the spectral range of >490 nm to 585 nm, and a laser light source R having a wavelength $\lambda_R$ in the spectral range of >585 nm to 750 nm; and a beam guidance element. The laser light source is suitable to generate in at least one point of the beam guidance element a mean surface power density of more than 10 W/cm², and the beam guidance element consists of a glass having a quality factor F(436 nm)=S(436 nm)*(Ext$_0$(436 nm)+Ext$_1$(436 nm))/k, where S(436 nm) is a thermality at a wavelength of 436 nm, Ext$_1$(436 nm) is an additional absorbance in comparison to Ext$_0$(436 nm) at a wavelength of 436 nm of a sample having a thickness of 10 mm after an irradiation of 15 hours with a HOK 4 lamp, Ext$_0$(436 nm) is an absorbance at a wavelength of 436 nm of a sample having a thickness of 10 mm without irradiation with a HOK 4 lamp, and k is a thermal conductivity, and F(436 nm) is <700 ppm/W.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
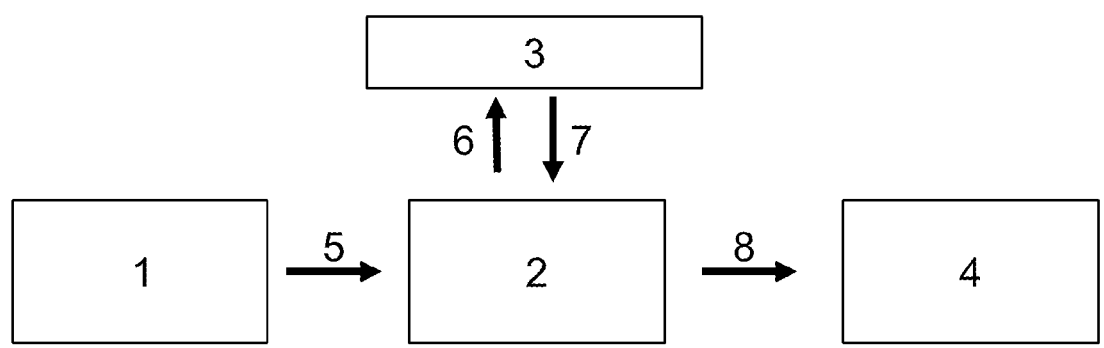
FIG. 1 is a schematic view of an exemplary embodiment of an imaging system provided according to the present invention.

Imaging systems, in particularly, are systems with at least one light source and at least one beam guidance element, in particularly lenses, prisms, aspheres and/or light-guiding rods. Such light-guiding rods utilize the total reflection at the interface glass/air, and typically they have a length of not more than 300 mm. Such imaging systems, for example, are used in projectors, in particularly in cinema projectors. In this connection an imaging system is used for generating (by a targeted beam guidance of the light of the light source) an image which is recognizable for the observer, for example on a screen. The highest power densities, normally, arise in the prisms, in particularly in prisms which are responsible for the mixing of the color channels. Therefore, it is important to provide such prisms-beam guidance elements being made of materials which can withstand these power densities without occurring relevant solarization effects. Imaging systems are also used in material processing. By targeted beam guidance it is possible to focus the light of the light source onto the material to be processed such that the energy input of the light radiation can be used for material processing.

Exemplary embodiments provided according to the present invention provide an imaging system including:
a) at least one laser light source selected from the group consisting of a laser light source B having a wavelength $\lambda_B$ in the spectral range of 380 nm to 490 nm, a laser light source G having a wavelength $\lambda_G$ in the spectral range of >490 nm to 585 nm and a laser light source R having a wavelength $\lambda_R$ in the spectral range of >585 nm to 750 nm, and
b) a beam guidance element, wherein the laser light source is suitable to generate in at least one point of the beam guidance element a mean surface power density of more than 10 W/cm², and the beam guidance element consists of a glass having a quality factor F(436 nm)=S(436 nm)*(Ext$_0$(436 nm)+Ext$_1$(436 nm))/k, wherein F(436 nm) is <700 ppm/W.

The imaging system provided according to the present invention may comprise further components, such as, for example, image-generating chips (such as DLP chips) and/or a projection optics.

The imaging system provided according to the present invention may comprise a laser light source B having a wavelength in the spectral range of 380 nm to 490 nm. In some embodiments, the imaging system comprises a laser light source B having a wavelength in the spectral range of 400 nm to 480 nm, such as of 420 nm to 470 nm, of 425 nm to 460 nm, or of 430 nm to 450 nm.

The imaging system provided according to the present invention may comprise a laser light source G having a wavelength $\lambda_G$ in the spectral range of >490 nm to 585 nm. In some embodiments, the imaging system comprises a laser light source G having a wavelength $\lambda_G$ in the spectral range of 510 nm to 580 nm, such as of 520 nm to 570 nm, of 530 nm to 560 nm, or of 540 nm to 550 nm.

The imaging system provided according to the present invention may comprise a laser light source R having a wavelength $\lambda_R$ in the spectral range of >585 nm to 750 nm. In some embodiments, the imaging system comprises a laser light source R having a wavelength $\lambda_R$ in the spectral range of 600 nm to 720 nm, such as of 610 nm to 700 nm, of 620 nm to 680 nm, of 630 nm to 660 nm, or of 640 nm to 650 nm.

The imaging system provided according to the present invention may comprise exactly one laser light source selected from the group consisting of a laser light source B having a wavelength $\lambda_B$ in the spectral range of 380 nm to 490 nm, a laser light source G having a wavelength $\lambda_G$ in the spectral range of >490 nm to 585 nm and a laser light source R having a wavelength $\lambda_R$ in the spectral range of >585 nm to 750 nm. Provided according to the present invention are, for example, imaging systems which comprise only one laser light source B having a wavelength $\lambda_B$ in the spectral range of 380 nm to 490 nm, or only one laser light source G having a wavelength $\lambda_G$ in the spectral range of >490 nm to 585 nm or only one laser light source R having a wavelength $\lambda_R$ in the spectral range of >585 nm to 750 nm.

In some embodiments, the imaging system provided according to the present invention may comprise exactly two laser light sources selected from the group consisting of a laser light source B having a wavelength $\lambda_B$ in the spectral range of 380 nm to 490 nm, a laser light source G having a wavelength $\lambda_G$ in the spectral range of >490 nm to 585 nm and a laser light source R having a wavelength $\lambda_R$ in the spectral range of >585 nm to 750 nm. Provided according to the present invention are, for example, imaging systems which comprise exactly one laser light source B having a wavelength $\lambda_B$ in the spectral range of 380 nm to 490 nm and exactly one laser light source G having a wavelength $\lambda_G$ in the spectral range of >490 nm to 585 nm, however no laser light source R having a wavelength $\lambda_R$ in the spectral range of >585 nm to 750 nm. Provided according to the present invention are also imaging systems which comprise exactly one laser light source B having a wavelength $\lambda_B$ in the spectral range of 380 nm to 490 nm and exactly one laser light source R having a wavelength $\lambda_R$ in the spectral range of >585 nm to 750 nm, however no laser light source G having a wavelength $\lambda_G$ in the spectral range of >490 nm to 585 nm. Provided according to the present invention are also imaging systems which comprise exactly one laser light source R having a wavelength $\lambda_R$ in the spectral range of >585 nm to 750 nm and exactly one laser light source G having a wavelength $\lambda_G$ in the spectral range of >490 nm to 585 nm, however no laser light source B having a wavelength in the spectral range of 380 nm to 490 nm.

In some embodiments, the imaging system provided according to the present invention comprises exactly three laser light sources selected from the group consisting of a laser light source B having a wavelength $\lambda_B$ in the spectral range of 380 nm to 490 nm, a laser light source G having a wavelength $\lambda_G$ in the spectral range of >490 nm to 585 nm and a laser light source R having a wavelength $\lambda_R$ in the spectral range of >585 nm to 750 nm. In some embodiments, the imaging system provided according to the present invention comprises a laser light source B having a wavelength $\lambda_B$ in the spectral range of 380 nm to 490 nm, a laser light source G having a wavelength $\lambda_G$ in the spectral range of >490 nm to 585 nm and a laser light source R having a wavelength $\lambda_R$ in the spectral range of >585 nm to 750 nm.

The laser light source (such as the laser light source B having a wavelength $\lambda_B$ in the spectral range of 380 nm to 490 nm, the laser light source G having a wavelength $\lambda_G$ in the spectral range of >490 nm to 585 nm and/or the laser light source R having a wavelength $\lambda_R$ in the spectral range of >585 nm to 750 nm) is suitable to generate in at least one point of the beam guidance element, for example on an area of at least 0.1 cm$^2$, such as at least 0.5 cm$^2$, at least 1 cm$^2$, at least 2 cm$^2$, at least 3 cm$^2$, at least 5 cm$^2$, at least 7 cm$^2$, or at least 9 cm$^2$ of the beam guidance element a mean surface power density of more than 10 W/cm$^2$. In some embodiments, the laser light source (such as the laser light source B having a wavelength $\lambda_B$ in the spectral range of 380 nm to 490 nm, the laser light source G having a wavelength $\lambda_G$ in the spectral range of >490 nm to 585 nm and/or the laser light source R having a wavelength $\lambda_R$ in the spectral range of >585 nm to 750 nm) is suitable to generate in at least one point of the beam guidance element, such as on an area of at least 0.1 cm$^2$, at least 0.5 cm$^2$, at least 1 cm$^2$, at least 2 cm$^2$, at least 3 cm$^2$, at least 5 cm$^2$, at least 7 cm$^2$, or at least 9 cm$^2$ of the beam guidance element a mean surface power density of more than 10 W/cm$^2$ to 75 W/cm$^2$, such as of 15 W/cm$^2$ to 60 W/cm$^2$ or of 20 W/cm$^2$ to 50 W/cm$^2$, such as for example 25 W/cm$^2$ to 45 W/cm$^2$ or 30 W/cm$^2$ to 40 W/cm$^2$.

In some embodiments, the laser light source B is suitable to generate in at least one point of the beam guidance element, such as on an area of at least 0.1 cm$^2$, at least 0.5 cm$^2$, at least 1 cm$^2$, at least 2 cm$^2$, at least 3 cm$^2$, at least 5 cm$^2$, at least 7 cm$^2$, or at least 9 cm$^2$ of the beam guidance element a mean surface power density of more than 10 W/cm$^2$. Further, in some embodiments, the laser light source B is suitable to generate in at least one point of the beam guidance element, such as on an area of at least 0.1 cm$^2$, at least 0.5 cm$^2$, at least 1 cm$^2$, at least 2 cm$^2$, at least 3 cm$^2$, at least 5 cm$^2$, at least 7 cm$^2$, or at least 9 cm$^2$ of the beam guidance element a mean surface power density of more than 10 W/cm$^2$ to 75 W/cm$^2$, such as of 15 W/cm$^2$ to 60 W/cm$^2$ or of 20 W/cm$^2$ to 50 W/cm$^2$, such as for example 25 W/cm$^2$ to 45 W/cm$^2$ or 30 W/cm$^2$ to 40 W/cm$^2$.

In some embodiments, the laser light source G is suitable to generate in at least one point of the beam guidance element, such as on an area of at least 0.1 cm$^2$, at least 0.5 cm$^2$, at least 1 cm$^2$, at least 2 cm$^2$, at least 3 cm$^2$, at least 5 cm$^2$, at least 7 cm$^2$, or at least 9 cm$^2$ of the beam guidance element a mean surface power density of more than 10 W/cm$^2$. Further, in some embodiments, the laser light source G is suitable to generate in at least one point of the beam guidance element, such as on an area of at least 0.1 cm$^2$, at least 0.5 cm$^2$, at least 1 cm$^2$, at least 2 cm$^2$, at least 3 cm$^2$, at least 5 cm$^2$, at least 7 cm$^2$, or at least 9 cm$^2$ of the beam guidance element a mean surface power density of more than 10 W/cm$^2$ to 75 W/cm$^2$, such as of 15 W/cm$^2$ to 60 W/cm$^2$ or of 20 W/cm$^2$ to 50 W/cm$^2$, such as for example 25 W/cm$^2$ to 45 W/cm$^2$ or 30 W/cm$^2$ to 40 W/cm$^2$.

In some embodiments, the laser light source R is suitable to generate in at least one point of the beam guidance element, such as on an area of at least 0.1 cm$^2$, at least 0.5 cm$^2$, at least 1 cm$^2$, at least 2 cm$^2$, at least 3 cm$^2$, at least 5 cm$^2$, at least 7 cm$^2$, or at least 9 cm$^2$ of the beam guidance element a mean surface power density of more than 10 W/cm$^2$. Further, in some embodiments, the laser light source R is suitable to generate in at least one point of the beam guidance element, such as on an area of at least 0.1 cm$^2$, at least 0.5 cm$^2$, at least 1 cm$^2$, at least 2 cm$^2$, at least 3 cm$^2$, at least 5 cm$^2$, at least 7 cm$^2$, or at least 9 cm$^2$ of the beam guidance element a mean surface power density of more than 10 W/cm$^2$ to 75 W/cm$^2$, such as of 15 W/cm$^2$ to 60 W/cm$^2$ or of 20 W/cm$^2$ to 50 W/cm$^2$, such as for example 25 W/cm$^2$ to 45 W/cm$^2$ or 30 W/cm$^2$ to 40 W/cm$^2$.

In some embodiments, the laser light source B, the laser light source G and the laser light source R are suitable to generate in at least one point of the beam guidance element, such as on an area of at least 0.1 cm$^2$, at least 0.5 cm$^2$, at least 1 cm$^2$, at least 2 cm$^2$, at least 3 cm$^2$, at least 5 cm$^2$, at least 7 cm$^2$, or at least 9 cm$^2$ of the beam guidance element a mean surface power density of more than 10 W/cm$^2$. Further, in some embodiments, the laser light source B, the laser light source G and the laser light source R are suitable to generate in at least one point of the beam guidance element, such as on an area of at least 0.1 cm$^2$, at least 0.5 cm$^2$, at least 1 cm$^2$, at least 2 cm$^2$, at least 3 cm$^2$, at least 5 cm$^2$, at least 7 cm$^2$, or at least 9 cm$^2$ of the beam guidance element a mean surface power density of more than 10 W/cm$^2$ to 75 W/cm$^2$, such as of 15 W/cm$^2$ to 60 W/cm$^2$ or of 20 W/cm$^2$ to 50 W/cm$^2$, such as for example 25 W/cm$^2$ to 45 W/cm$^2$ or 30 W/cm$^2$ to 40 W/cm$^2$.

The imaging system provided according to the present invention comprises a beam guidance element which consists of a glass having a quality factor $F(436 \text{ nm})=S(436 \text{ nm})*(Ext_0(436 \text{ nm})+Ext_1(436 \text{ nm}))/k$, wherein $F(436 \text{ nm})$ is <700 ppm/W.

Under irradiation with energetic photons in the UV range in materials defects are induced which lead to changes in the spectral transmission. When they are in the visible spectral range, then this is accompanied by undesired color changes. This phenomenon is in particularly not desired in the case of optical components made of glass. Surprisingly, now, it has been shown that in the case of high laser power densities also in the visible spectral range, e.g. at 450 nm, defect centers can be induced (=solarization), such as is found with conventional light sources only in the case, when they emit in the UV/NUV. Without being limited to a certain explanation, here it is assumed that the occurrence of solarization effects in the case of irradiation with visible light can in particularly be attributed to non-linear effects which are concomitant phenomena of the high power densities. When an excitation with sufficient power density is conducted, then it might be possible that a two-photons-absorption takes place which corresponds to the energy of one photon with half the wavelength (e.g. 450 nm/2=225 nm) and thus quasi a UV absorption. In contrast to conventional UV solarization, this effect is normally not limited to a volume of the glass near the surface facing the light source, but it can happen along the whole optical path length. The formed defect centers induce new absorption bands which reduce the transmitted intensity.

The induced absorption bands are accompanied by a temperature increase within the optical material/glass; since refraction number and geometric path change with the temperature, a wavefront deceleration and undesired aberrations are the result.

Particularly high requirements ensue from this for the material of beam guidance elements which are used in imaging systems comprising laser light sources which are suitable to generate in at least one point of the beam guidance element a mean surface power density of more than 10 W/cm². Therefore, exemplary embodiments provided according to the present invention provide imaging systems which avoid or at least strongly reduce undesired aberrations.

An exemplary embodiment of an imaging system provided according to the present invention is schematically shown in FIG. 1. According to this embodiment, the imaging system is a DLP projector. The phrase "DLP" is an abbreviation for the English term "digital light processing". The imaging system provided according to the present invention shown in FIG. 1 comprises a laser light source 1 and a beam guidance element 2. According to the present invention, the imaging system comprises at least one laser light source selected from the group consisting of a laser light source B having a wavelength $\lambda_B$ in the spectral range of 380 nm to 490 nm, a laser light source G having a wavelength $\lambda_G$ in the spectral range of >490 nm to 585 nm and a laser light source R having a wavelength $\lambda_R$ in the spectral range of >585 nm to 750 nm. Thus, it is also possible that more than one of the mentioned laser light sources are present in the imaging system provided according to the present invention, in particularly a blue laser light source, a green laser light source and a red laser light source. The laser light source 1 shown in FIG. 1 in a simplified manner as a single box may, for example, represent three diode lasers with different colors, for example a blue diode laser, a green diode laser and a red diode laser. It is also possible that only one single laser light source is present, such as for example a blue laser light source. In some embodiments, it is possible that with the help of a converter, such as a ceramic converter, blue light which is emitted by a blue laser light source via luminescence is converted into light with higher wavelength, such as, for example, into yellow, green, red and/or yellow-green light.

In the DLP projector shown in FIG. 1, the laser light source 1 emits blue, green and red light (represented by the arrow 5). This may, for example, be achieved by the fact that the laser light source 1 represents the presence of a blue, a green and a red diode laser. It is also possible that only a blue laser is present and that the additionally emitted green and red light is generated by the use of converter material. The three colors 5 emitted by the laser light source 1 after leaving the laser light source 1 reach the beam guidance element 2. The beam guidance element 2 comprises at least one prism and, for example, it may also represent an arrangement of prisms comprising several prisms. An arrangement of prisms may, for example, consist of two or three prisms. With the arrow 6 it is shown that the beam guidance element 2 redirects the light of the three colors emitted by the laser light source 1 to image-generating chips 3. In some embodiments, the light of each of the three colors (blue, green and red) is redirected to one image-generating chip 3 each. For the sake of simplicity, in FIG. 1 only one single box is shown which represents the image-generating chips 3. Exemplary image-generating chips 3 are DLP chips 3. In some embodiments, the imaging system comprises one image-generating chip 3 each for each color channel. Thus, in some embodiments, the box shown in FIG. 1 represents three image-generating chips 3 (one each for blue, green and red), such as three DLP chips 3.

Then, the images generated by the DLP chips 3 (such as one image each in blue, green and red) reach the beam guidance element 2, such as the prism 2 or the arrangement of prisms 2. This is shown by the arrow 7.

Then, the beam guidance element 2 ensures that a composite color image reaches the projection optics 4. This is shown by the arrow 8.

In the region of the beam guidance element 2 it is possible that very high surface power densities arise. Therefore, it is important that the beam guidance element 2 consists of a glass having a quality factor provided according to the present invention.

This is solved by the fact that the beam guidance element consists of a glass having a quality factor $F(436\ nm)=S(436\ nm)*(Ext_0(436\ nm)+Ext_1(436\ nm))/k$, wherein $F(436\ nm)$ is <700 ppm/W.

The quality factor F takes different factors into account, which in the combination found here lead to the reduction of aberrations. Here, both, wavelength-dependent and also wavelength-independent factors are taken into account. The quality factor $F(436nm)$ at a wavelength of 436 nm is representative for the behavior of the glass in the spectral range of 380 nm to 490 nm. This range in turn is representative for the behavior of the glass in the whole visible spectral range. According to the present invention, the following is true: $F(436\ nm)<700$ ppm/W.

The behavior of the glass at wavelengths outside the range of 380 nm to 490 nm, in some cases, may contribute to aberrations, albeit in a lesser extent. In principle, the quality factor $F(436\ nm)$ is sufficient for describing the quality of the glass. In certain cases, however, it may be reasonable to take, besides the behavior of the glass at a wavelength of 436 nm, also the behavior at a wavelength of 546 nm which is representative for the wavelength range of >490 nm to 585 nm, and/or at a wavelength of 644 nm which is representative for the wavelength range of >585 nm to 750 nm into account. In some embodiments, the beam guidance element consists of a glass which has a quality factor $F(546\ nm)=S(546\ nm)*(Ext_0(546\ nm)+Ext_1(546\ nm))/k$, wherein $F(546\ nm)$ is <215 ppm/W, and/or which has a quality factor $F(644\ nm)=S(644\ nm)*(Ext_0(644\ nm)+Ext_1(644\ nm))/k$, wherein $F(644\ nm)$ is <85 ppm/W.

From the behavior of the glass at 436 nm, 546 nm and 644 nm a quality factor F(RGB) can be determined. In some embodiments, the beam guidance element consists of a glass which has a quality factor $F(RGB)=F(436\ nm)+F(546\ nm)+F(644\ nm)=S(436\ nm)*(Ext_0(436\ nm)+Ext_1(436\ nm))/k+S(546\ nm)*(Ext_0(546\ nm)+Ext_1(546\ nm))/k+S(644\ nm)*(Ext_0(644\ nm)+Ext_1(644\ nm))/k$, wherein F(RGB) is <1000 ppm/W.

The quality factor F takes the thermality $S(\lambda)$, the not-induced absorbance $Ext_0(80)$, the induced absorbance $Ext_1(\lambda)$ and the thermal conductivity k of the glass into account. Thermality, not-induced absorbance and induced absorbance are wavelength-dependent parameters. The thermal conductivity is independent of the wavelength. The not-induced absorbance $Ext_0(\lambda)$ may be used as a measure for the absorbance in the delivery condition or before the use according to its intended purpose. The induced absorbance $Ext_1(\lambda)$ may be used as a measure for the absorbance being potentially induced by the appropriate operation.

According to the present invention, the following is true: F(436 nm)<700 ppm/W. In some embodiments, F(436 nm) is at most 600 ppm/W, such as at most 500 ppm/W, at most 400 ppm/W, at most 350 ppm/W, at most 300 ppm/W, at most 275 ppm/W, at most 250 ppm/W, at most 225 ppm/W, at most 210 ppm/W, at most 200 ppm/W, at most 150 ppm/W, at most 100 ppm/W, at most 75 ppm/W, at most 50 ppm/W, at most 25 ppm/W, at most 20 ppm/W, at most 15 ppm/W, or at most 10 ppm/W. In some embodiments, F(436 nm) is at least 0.1 ppm/W, at least 0.5 ppm/W, at least 1 ppm/W or at least 2 ppm/W.

In some embodiments, the following is true: F(546 nm)<215 ppm/W. Further, in some embodiments, F(546 nm) is at most 200 ppm/W, such as at most 175 ppm/W, at most 150 ppm/W, at most 125 ppm/W, at most 100 ppm/W, at most 90 ppm/W, at most 80 ppm/W, at most 70 ppm/W, at most 60 ppm/W, at most 50 ppm/W, at most 40 ppm/W, at most 30 ppm/W, at most 20 ppm/W, at most 15 ppm/W, at most 10 ppm/W, at most 8 ppm/W, at most 6 ppm/W, or at most 5 ppm/W. In some embodiments, F(546 nm) is at least 0.001 ppm/W, at least 0.005 ppm/W, at least 0.01 ppm/W, at least 0.02 ppm/W, at least 0.1 ppm/W, at least 0.5 ppm/W or at least 1 ppm/W.

In some embodiments, the following is true: F(644 nm)<85 ppm/W. Further, in some embodiments, F(644 nm) is at most 80 ppm/W, such as at most 75 ppm/W, at most 70 ppm/W, at most 65 ppm/W, at most 60 ppm/W, at most 55 ppm/W, at most 50 ppm/W, at most 45 ppm/W, at most 40 ppm/W, at most 35 ppm/W, at most 30 ppm/W, at most 25 ppm/W, at most 20 ppm/W, at most 15 ppm/W, at most 10 ppm/W, at most 8 ppm/W, at most 6 ppm/W, or at most 5 ppm/W. In some embodiments, F(546 nm) is at least 0.001 ppm/W, at least 0.005 ppm/W, at least 0.01 ppm/W or at least 0.02 ppm/W, at least 0.1 ppm/W, at least 0.5 ppm/W or at least 1 ppm/W.

Therefore, in some embodiments, the beam guidance element consists of a glass which has a quality factor $F(RGB)=F(436\text{ nm})+F(546\text{ nm})+F(644\text{ nm})=S(436\text{ nm})*(Ext_0(436\text{ nm})+Ext_1(436\text{ nm}))/k+S(546\text{ nm})*(Ext_0(546\text{ nm})+Ext_1(546\text{ nm}))/k+S(644\text{ nm})*(Ext_0(644\text{ nm})+Ext_1(644\text{ nm}))/k$, wherein F(RGB) is <1000 ppm/W. In some embodiments, F(RGB) is at most 900 ppm/W, at most 800 ppm/W, at most 700 ppm/W, at most 600 ppm/W, at most 500 ppm/W, at most 400 ppm/W, at most 350 ppm/W, at most 300 ppm/W, at most 250 ppm/W, at most 200 ppm/W, at most 150 ppm/W, at most 100 ppm/W, at most 80 ppm/W, at most 60 ppm/W, at most 50 ppm/W, at most 40 ppm/W, at most 30 ppm/W, at most 25 ppm/W, or at most 20 ppm/W. In some embodiments, F(RGB) is at least 0.5 ppm/W, at least 1 ppm/W, at least 2 ppm/W or at least 5 ppm/W.

A parameter which has a significant influence onto the quality factor F is the wavelength-dependent thermality $S(\lambda)$. The thermality describes the relative change of the optical path $s=(n-1)*d$ with the temperature T, wherein n is the refractive index and d is the sample thickness. The following is true: $S=1/s*ds/dT$. Since also the following is true: $d=d(T)$ and $n=n(T)$, also the following is valid: $S=1/s * (dn/dT*d+(n-1) dd/dT)$. According to that, also the following is true: $S=1/(n-1)*dn/dT+1/d*dd/dT=1/(n-1)*dn/dT+CTE$. The CTE is the coefficient of thermal expansion or thermal expansion coefficient.

In some embodiments, the coefficient of thermal expansion is determined such as described in DIN 51045-1:2005-08 and DIN ISO 7991 1998-02. Here, a glass sample with defined length is prepared, and in a dilatometer the relative change in length (DeltaL/L) per temperature interval (Delta T) is measured. For the calculation of the thermality $S(\lambda)$, In some embodiments, the mean coefficient of thermal expansion in a temperature interval of −30° C. to +70° C. is used. A low coefficient of thermal expansion may be advantageous, in particularly in a temperature range of −30° C. to 70° C. (CTE (|30/70)). In some embodiments, the CTE (−30/70) is in a range 3.0 to 14.0 ppm/K, such as of 4.0 to 10.0 ppm/K, of 4.5 to 9.5 ppm/K, of 5.0 to 8.0 ppm/K, and/or of 5.5 to 7.5 ppm/K, such as for example of 5.6 to 7.3 ppm/K or of 5.7 to 7.2 ppm/K.

The determination of dn/dT may be realized with a prism spectrometer (with a whole prism) which is positioned in a temperature chamber. In some embodiments, the measurement is conducted in a configuration in which the total deflection angle becomes minimal, because then the refraction number can be calculated only by the deflection angle and the known prism angle.

However, the determination of dn/dT may be realized with the half-prism method. For that, the sample in the form of a half-prism is positioned in a temperature-controlled sample chamber. The prism is irradiated with light of different wavelengths and the deflection angle is determined each. During that, the temperature in the chamber is varied. So, the refractive power is obtained as a function of the wavelength and the temperature. For the calculation of the thermality $S(\lambda)$, In some embodiments, the mean dn/dT in a temperature range of +20° C. to +40° C. is used. For keeping the extent of thermal lens effects as small as possible it may be advantageous, when the change of the refractive index with the temperature (dn/dT) is as low as possible, such as within a temperature range of 20° C. to 40° C. In some embodiments, the mean dn/dT at a wavelength of 436 nm, 546 nm and/or 644 nm in a temperature range of 20° C. to 40° C. is in a range of 0.1 to 8.0 ppm/K, such as of 0.2 to 7.0 ppm/K, of 0.3 to 6.0 ppm/K and/or of 0.4 to 5.0 ppm/K, wherein the information relates to the absolute value (absolute amount) of the mean dn/dT.

Such as described previously, the induced absorption bands are accompanied by a temperature increase within the glass so that a wavefront deceleration and undesired aberrations result, when refraction number and geometric path change with the temperature. Therefore, in some embodiments, the change of the optical path with the temperature (the thermality S) is low. In this way, aberrations can be minimized, even in the case, when induced absorption bands arise.

In some embodiments, S(436 nm) is at most 50 ppm/K, such as at most 30 ppm/K, at most 25 ppm/K, at most 20 ppm/K, at most 15 ppm/K, or at most 10 ppm/K. In some embodiments, S(436 nm) is at least 0.1 ppm/K, at least 0.5 ppm/K, at least 1 ppm/K, or at least 2 PPm/K.

In some embodiments, S(546 nm) is at most 50 ppm/K, at most 30 ppm/K, at most 25 ppm/K, at most 20 ppm/K, at most 15 ppm/K, or at most 10 ppm/K. In some embodiments, S(546 nm) is at least 0.1 ppm/K, at least 0.5 ppm/K, at least 1 ppm/K or at least 2 ppm/K.

In some embodiments, S(644 nm) is at most 50 ppm/K, at most 30 ppm/K, at most 25 ppm/K, at most 20 ppm/K, at most 15 ppm/K, or at most 10 ppm/K. In some embodiments, S(644 nm) is at least 0.1 ppm/K, at least 0.5 ppm/K, at least 1 ppm/K or at least 2 ppm/K.

In some embodiments, S(436 nm), S(546 nm) and S(644 nm) are at most 50 ppm/K, at most 30 ppm/K, at most 25 ppm/K, at most 20 ppm/K, at most 15 ppm/K, or at most 10 ppm/K. In some embodiments, S(436 nm), S(546 nm) and S(644 nm) are at least 0.1 ppm/K, at least 0.5 ppm/K, at least 1 ppm/K or at least 2 ppm/K.

Further important parameters are the not-induced absorbance $Ext_0$ and the induced absorbance $Ext_1$. $Ext_1(\lambda)$ describes the (in comparison to $Ext_0(\lambda)$) additional absorbance per cm at the wavelength $\lambda$. after irradiation of the sample. The induced absorbance $Ext_1$ is i.a. dependent on the kind of the irradiation source. For evaluating materials with respect to their solarization resistance, a test with a Hg high pressure lamp (HOK 4) has shown to be advantageous. According to the present invention, the induced absorbance $Ext_1(\lambda)$ describes the (in comparison to $Ext_0(\lambda)$) additional absorbance per cm at a wavelength $\lambda$ of a sample with a sample thickness d of 10 mm after irradiation with a HOK 4 lamp for 15 hours. On the other hand, the not-induced absorbance $Ext_0(\lambda)$ describes the absorbance per cm at a wavelength $\lambda$ of a sample with a sample thickness d of 10 mm prior to irradiation.

Figure 2:
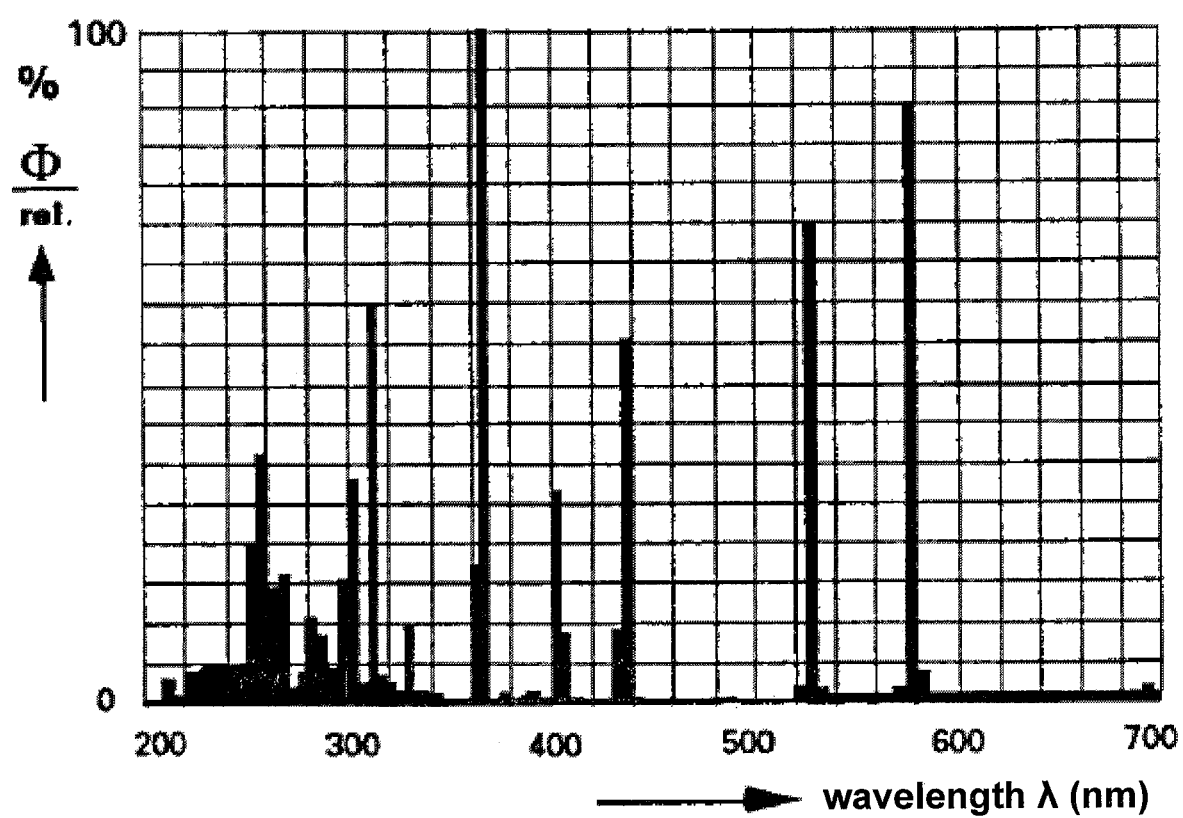
FIG. 2 illustrates a spectrum of an HOK 4/120 lamp.

In some embodiments, a HOK 4/120 lamp from Philips is used. The spectrum of this HOK 4/120 lamp is shown in FIG. 2. In some embodiments, the distance between the lamp and the sample is 7 cm. In some embodiments, the power density is 25 mW/cm². In some embodiments, the sample size is 20 mm×30 mm×10 mm. Here, the dimension of 10 mm, such as already described previously, is referred to as sample thickness d.

It may be advantageous when $Ext_0$ and $Ext_1$ are low. Hence, both values in sum make a contribution to the quality factor F.

A low not-induced absorbance $Ext_0$ may be advantageous, because thus quasi a low initial absorbance without previous irradiation with the HOK 4 lamp exists.

A low induced absorbance $Ext_1$ may also be advantageous. It indicates that also after irradiation no excessive absorbance occurs, and so it is a measure for the solarization resistance.

The absorbance $Ext(\lambda)$ is described as quotient of the natural logarithm of the quotient of incident radiation $I_0$ and emitting radiation I of the wavelength $\lambda$ as dividend and the sample thickness d as divisor: $Ext(\lambda)=\ln(I_0/I)/d$. In this way, both, $Ext_0$ and also $Ext_1$ can be determined. Such as already described previously, according to the present invention, the sample thickness d is 10 mm.

In some embodiments, $Ext_0$(436 nm) is less than 0.01/cm, such as at most 0.008/cm, at most 0.005/cm, at most 0.004/cm, at most 0.003/cm, or at most 0.002/cm. In some embodiments, $Ext_0$(436 nm) is at least 0.0001/cm, at least 0.0002/cm, at least 0.0003/cm or at least 0.0005/cm.

In some embodiments, $Ext_0$(546 nm) is less than 0.01/cm, such as at most 0.008/cm, at most 0.005/cm, at most 0.004/cm, at most 0.003/cm, at most 0.002/cm, less than 0.0015/cm, or less than 0.001/cm. In some embodiments, $Ext_0$(546 nm) is at least 0.0001/cm, at least 0.0002/cm, at least 0.0003/cm or at least 0.0005/cm.

In some embodiments, $Ext_0$(644 nm) is less than 0.01/cm, such as at most 0.008/cm, at most 0.005/cm, at most 0.004/cm, at most 0.003/cm, at most 0.002/cm, or less than 0.0015/cm. In some embodiments, $Ext_0$(644 nm) is at least 0.0001/cm, at least 0.0002/cm, at least 0.0003/cm or at least 0.0005/cm.

In some embodiments, $Ext_0$(436 nm), $Ext_0$(546 nm) and $Ext_0$(644 nm) are less than 0.01/cm, such as at most 0.008/cm, at most 0.005/cm, at most 0.004/cm, at most 0.003/cm, or at most 0.002/cm. In some embodiments, $Ext_0$(436 nm), $Ext_0$(546 nm) and $Ext_0$(644 nm) are at least 0.0001/cm, at least 0.0002/cm, at least 0.0003/cm or at least 0.0005/cm.

In some embodiments, $Ext_1$(436 nm) is less than 0.3/cm, such as at most 0.2/cm, at most 0.1/cm, at most 0.08/cm, at most 0.06/cm, at most 0.04/cm, at most 0.02/cm, at most 0.01/cm, at most 0.009/cm, at most 0.008/cm, at most 0.007/cm, or at most 0.006/cm. In some embodiments, $Ext_1$(436 nm) is at least 0.0005/cm, at least 0.001/cm, at least 0.0015/cm or at least 0.02/cm.

In some embodiments, $Ext_1$(546 nm) is less than 0.3/cm, such as at most 0.2/cm, at most 0.1/cm, at most 0.08/cm, at most 0.06/cm, at most 0.04/cm, at most 0.02/cm, at most 0.01/cm, at most 0.009/cm, at most 0.008/cm, at most 0.007/cm, at most 0.006/cm, at most 0.005/cm, at most 0.004/cm, or at most 0.003/cm. In some embodiments, $Ext_1$(546 nm) is at least 0.0001/cm, at least 0.0002/cm, at least 0.0003/cm or at least 0.0005/cm.

In some embodiments, $Ext_1$(644 nm) is less than 0.3/cm, such as at most 0.2/cm, at most 0.1/cm, at most 0.08/cm, at most 0.06/cm, at most 0.04/cm, at most 0.02/cm, at most 0.01/cm, at most 0.009/cm, at most 0.008/cm, at most 0.007/cm, at most 0.006/cm, at most 0.005/cm, at most 0.004/cm, or at most 0.003/cm. In some embodiments, $Ext_1$(644 nm) is at least 0.0001/cm, at least 0.0002/cm, at least 0.0003/cm or at least 0.0005/cm.

In some embodiments, $Ext_1$(436 nm), $Ext_1$(546 nm) and $Ext_1$(644 nm) are less than 0.3/cm, such as at most 0.2/cm, at most 0.1/cm, at most 0.08/cm, at most 0.06/cm, at most 0.04/cm, at most 0.02/cm, at most 0.01/cm, at most 0.009/cm, at most 0.008/cm, at most 0.007/cm, or at most 0.006/cm. In some embodiments, $Ext_1$(436 nm), $Ext_1$(546 nm) and $Ext_1$(644 nm) are at least 0.0001/cm, at least 0.0002/cm, at least 0.0003/cm or at least 0.0005/cm.

A further important parameter is the thermal conductivity k. The thermal conductivity is the product of density, specific heat capacity and temperature conductivity. In some embodiments, the determination of the density is conducted according to the principle of Archimedes (in particularly ASTM C693:1993). For determining the temperature dependence of the density, the expansion behavior is determined, such as by dilatometry, such as described in DIN 51045-1: 2005-08 and DIN ISO 7991: 1998-02. The specific heat capacity may be determined by DSC (dynamic differential calorimetry, differential scanning calorimetry) according to DIN 51007:2019-04. The temperature conductivity may be determined by flash analysis according to ASTM E1461: 2013.

A high thermal conductivity k limits the stationary temperature increase of the optical glass in the beam path. In some embodiments, the thermal conductivity k is higher than 0.005 W/(cm*K), such as at least 0.006 W/(cm*K), at least 0.007 W/(cm*K), at least 0.008 W/(cm*K), such as for example at least 0.009 W/(cm*K) or at least 0.010 W/(cm*K). In some embodiments, the thermal conductivity k is at most 0.050 W/(cm*K), at most 0.040 W/(cm*K), at most 0.030 W/(cm*K), at most 0.020 W/(cm*K) or at most 0.015 W/(cm*K).

Such as described previously, the beam guidance elements are made of a glass which in a particular extent is solarization resistant, in particularly in the blue spectral range. This may be advantageous for corresponding uses in projectors and in material processing, because with that the occurrence of thermal lens effects is dramatically reduced. Further aspects may make additional contributions to the reduction of thermal lens effects. For example, in the case of a given local lodged thermal power (by absorption of the laser light) with increasing thermal conduction the temperature difference which is adjusted in a stationary manner becomes smaller, and with that the temperature-induced aberrations. Therefore, a high thermal conductivity k may be advantageous.

Depending on the application field, also the refractive index may play a role. In some embodiments, the refractive index at a wavelength of 436 nm, 546 nm and/or 644 nm is in a range of 1.45 to 1.65.

It has been shown that most different glass families can be used for obtaining a glass having the quality factor according to the present invention. The glass may be selected from the group consisting of fluorophosphate glass, silicate glass, borosilicate glass, niobium phosphates and alumino-borosilicate glass. The used refining agents have particular relevance, such as explained further herein.

In some embodiments, the beam guidance element consists of a glass comprising the following components in the given portions (in % by weight).

|  | from | to |
|---|---|---|
| $SiO_2$ | 0 | 80 |
| $B_2O_3$ | 0 | 30 |
| $Al_2O_3$ | 0 | 25 |
| $Li_2O$ | 0 | 5 |
| $Na_2O$ | 0 | 20 |
| $K_2O$ | 0 | 25 |
| MgO | 0 | 10 |
| CaO | 0 | 20 |
| BaO | 0 | 55 |
| ZnO | 0 | 35 |
| SrO | 0 | 25 |
| $TiO_2$ | 0 | 5 |
| $ZrO_2$ | 0 | 15 |
| $La_2O_3$ | 0 | 25 |
| $P_2O_5$ | 0 | 45 |
| $Nb_2O_5$ | 0 | 50 |
| F | 0 | 45 |
| $Sb_2O_3$ | 0 | 0.5 |
| $As_2O_3$ | 0 | <0.3 |
| $SnO_2$ | 0 | 0.5 |

For example, the glass provided according to the present invention may be a fluorophosphate glass. An exemplary fluorophosphate glass provided according to the present invention comprises the following components in the given portions (in % by weight).

|  | from | to |
|---|---|---|
| $SiO_2$ | 0 | 5 |
| $B_2O_3$ | 0 | 5 |
| $Al_2O_3$ | 5 | 25 |
| $Li_2O$ | 0 | 5 |
| $Na_2O$ | 0 | 5 |
| $K_2O$ | 0 | 5 |
| MgO | 1 | 10 |
| CaO | 5 | 20 |
| BaO | 10 | 30 |
| ZnO | 0 | 5 |
| SrO | 10 | 25 |
| $TiO_2$ | 0 | 5 |
| $ZrO_2$ | 0 | 5 |
| $La_2O_3$ | 0 | 5 |
| $P_2O_5$ | 5 | 15 |
| F | 15 | 45 |
| $Sb_2O_3$ | 0 | 0.5 |
| $As_2O_3$ | 0 | <0.3 |
| $SnO_2$ | 0 | 0.5 |

The fluorophosphate glass provided according to the present invention may contain less than 0.3% by weight, such as at most 0.2% by weight or at most 0.1% by weight of each of the components $SiO_2$, $B_2O_3$, $Li_2O$, $Na_2O$, $K_2O$, ZnO, $TiO_2$, $ZrO_2$, $La_2O_3$, $Sb_2O_3$, $As_2O_3$ and $SnO_2$, or it is even free of these components.

In some embodiments, the fluorophosphate glass contains $Al_2O_3$ in a portion of 7.5 to 22.5% by weight, such as of 10 to 20% by weight or of 14 to 19% by weight.

In some embodiments, the fluorophosphate glass contains MgO in a portion of 1.5 to 7.5% by weight, such as of 2 to 5% by weight or of 2.5 to 3.5% by weight.

In some embodiments, the fluorophosphate glass contains CaO in a portion of 7.5 to 15% by weight, such as of 9 to 14% by weight or of 10 to 13% by weight.

In some embodiments, the fluorophosphate glass contains BaO in a portion of 11 to 25% by weight, such as of 12 to 20% by weight or of 13 to 17% by weight.

In some embodiments, the fluorophosphate glass contains SrO in a portion of 15 to 24% by weight, such as of 16 to 23% by weight or of 16.5 to 22% by weight.

In some embodiments, the fluorophosphate glass contains $P_2O_5$ in a portion of 6 to 12% by weight, such as of 7 to 11% by weight or of 8 to 10% by weight.

In some embodiments, the fluorophosphate glass contains F in a portion of 20 to 40% by weight, such as of 25 to 35% by weight or of 27.5 to 32.5% by weight.

For example, the glass provided according to the present invention may be a silicate glass. An exemplary silicate glass provided according to the present invention comprises the following components in the given portions (in % by weight).

|  | from | to |
|---|---|---|
| $SiO_2$ | 30 | 55 |
| $B_2O_3$ | 0 | 5 |
| $Al_2O_3$ | 0 | 5 |
| $Li_2O$ | 0.1 | 5 |
| $Na_2O$ | 1 | 20 |
| $K_2O$ | 0.5 | 15 |
| MgO | 0 | 5 |
| CaO | 0 | 5 |
| BaO | 1 | 30 |
| ZnO | 2 | 35 |
| SrO | 0 | 5 |
| $TiO_2$ | 0 | 5 |
| $ZrO_2$ | 1 | 15 |
| $La_2O_3$ | 1 | 25 |
| $P_2O_5$ | 0 | 5 |
| F | 0 | 5 |
| $Sb_2O_3$ | 0 | 0.5 |
| $As_2O_3$ | 0 | <0.3 |
| $SnO_2$ | 0 | 0.5 |

The silicate glass provided according to the present invention may contain less than 0.3% by weight, such as at most 0.2% by weight or at most 0.1% by weight of each of the components $B_2O_3$, $Al_2O_3$, MgO, CaO, SrO, $TiO_2$, $P_2O_5$, F, $Sb_2O_3$ and $As_2O_3$, or is even free of these components.

In some embodiments, the silicate glass contains $SiO_2$ in a portion of 35 to 50% by weight, such as of 37.5 to 47.5% by weight or of 40 to 45% by weight.

In some embodiments, the silicate glass contains $Li_2O$ in a portion of 0.2 to 4% by weight, such as of 0.4 to 2% by weight or of 0.5 to 1.5% by weight.

In some embodiments, the silicate glass contains Na2O in a portion of 2 to 15% by weight, such as of 3 to 10% by weight or of 4 to 7.5% by weight.

In some embodiments, the silicate glass contains $K_2O$ in a portion of 1 to 10% by weight, such as of 1.5 to 7.5% by weight or of 2 to 5% by weight.

In some embodiments, the sum of the portions of the alkali metal oxides (R$_2$O) in the silicate glass is in a range of 1 to 20% by weight, such as of 2 to 15% by weight or of 5 to 12.5% by weight. In some embodiments, besides Li$_2$O, Na$_2$O and/or K$_2$O the glass does not contain further alkali metal oxides.

In some embodiments, the silicate glass contains BaO in a portion of 2 to 25% by weight, such as of 5 to 20% by weight or of 7.5 to 15% by weight.

In some embodiments, the silicate glass contains ZnO in a portion of 5 to 30% by weight, such as of 10 to 27.5% by weight or of 15 to 25% by weight.

In some embodiments, the silicate glass contains ZrO$_2$ in a portion of 1.5 to 10% by weight, such as of 2 to 8.5% by weight or of 3 to 7% by weight.

In some embodiments, the silicate glass contains La$_2$O$_3$ in a portion of 2 to 20% by weight, such as of 5 to 15% by weight or of 7.5 to 12.5% by weight.

In some embodiments, the silicate glass contains SnO$_2$ in a portion of 0.05 to 0.4% by weight, such as of 0.1 to 0.35% by weight or of 0.15 to 0.25% by weight.

For example, the glass provided according to the present invention may be a borosilicate glass. An exemplary borosilicate glass provided according to the present invention comprises the following components in the given portions (in % by weight).

|  | from | to |
| --- | --- | --- |
| SiO$_2$ | 50 | 80 |
| B$_2$O$_3$ | 2 | 30 |
| Al$_2$O$_3$ | 0 | 5 |
| Li$_2$O | 0 | 5 |
| Na$_2$O | 0 | 20 |
| K$_2$O | 1 | 25 |
| MgO | 0 | 5 |
| CaO | 0 | 10 |
| BaO | 0 | 10 |
| ZnO | 0 | 5 |
| SrO | 0 | 5 |
| TiO$_2$ | 0 | 5 |
| ZrO$_2$ | 0 | 5 |
| La$_2$O$_3$ | 0 | 5 |
| P$_2$O$_5$ | 0 | 5 |
| F | 0 | 20 |
| Sb$_2$O$_3$ | 0 | 0.5 |
| As$_2$O$_3$ | 0 | <0.3 |
| SnO$_2$ | 0 | 0.5 |

The borosilicate glass according to the present invention may contain less than 0.3% by weight, such as at most 0.2% by weight or at most 0.1% by weight of each of the components Al$_2$O$_3$, Li$_2$O, MgO, ZnO, SrO, ZrO$_2$, La$_2$O$_3$, P$_2$O$_5$, As$_2$O$_3$ and SnO$_2$, or is even free of these components.

In some embodiments, the borosilicate glass contains SiO$_2$ in a portion of 52.5 to 77.5% by weight, such as of 55 to 75% by weight or of 57.5 to 72.5% by weight.

In some embodiments, the borosilicate glass contains B$_2$O$_3$ in a portion of 5 to 25% by weight, such as of 7.5 to 20% by weight or of 9 to 19% by weight.

In some embodiments, the borosilicate glass contains Na2O in a portion of 0 to 17.5% by weight, such as of 0 to 15% by weight or of 0 to 12.5% by weight. In some embodiments, the glass contains at least 2% by weight, at least 5% by weight or even at least 8% by weight of Na$_2$O.

In some embodiments, the borosilicate glass contains K$_2$O in a portion of 2 to 24% by weight, such as of 4 to 23% by weight or of 6 to 22% by weight.

In some embodiments, the sum of the portions of the alkali metal oxides (R20) in the borosilicate glass is in a range of 5 to 30% by weight, such as of 10 to 25% by weight or of 15 to 22% by weight. In some embodiments, besides Na2O and/or K$_2$O the glass does not contain further alkali metal oxides.

In some embodiments, the borosilicate glass contains CaO in a portion of 0 to 5% by weight, such as of 0 to 2% by weight or of 0 to 1% by weight. In some embodiments, the glass contains at least 0.1% by weight or at least 0.2% by weight of CaO.

In some embodiments, the borosilicate glass contains BaO in a portion of 0 to 5% by weight, such as of 0 to 3.5% by weight or of 0 to 2% by weight. In some embodiments, the glass contains at least 0.1% by weight of BaO.

In some embodiments, the borosilicate glass contains TiO2 in a portion of 0 to 2% by weight, such as of 0 to 1% by weight or of 0 to 0.5% by weight. In some embodiments, the glass contains at least 0.1% by weight of TiO$_2$.

In some embodiments, the borosilicate glass contains F in a portion of 0 to 15% by weight, such as of 0 to 12.5% by weight or of 0 to 10% by weight. In some embodiments, the glass contains at least 1% by weight, at least 2% by weight or even at least 5% by weight of F.

In some embodiments, the borosilicate glass contains Sb$_2$O$_3$ in a portion of 0.01 to 0.45% by weight, such as of 0.01 to 0.4% by weight or of 0.01 to 0.35% by weight.

For example, the glass provided according to the present invention may be an alumino-borosilicate glass. An exemplary alumino-borosilicate glass provided according to the present invention comprises the following components in the given portions (in % by weight).

|  | from | to |
| --- | --- | --- |
| SiO$_2$ | 60 | 80 |
| B$_2$O$_3$ | 5 | 30 |
| Al$_2$O$_3$ | 0.1 | 15 |
| Li$_2$O | 0 | 5 |
| Na$_2$O | 0.1 | 15 |
| K$_2$O | 1 | 20 |
| MgO | 0 | 5 |
| CaO | 0 | 5 |
| BaO | 0 | 10 |
| ZnO | 0 | 10 |
| SrO | 0 | 5 |
| TiO$_2$ | 0 | 5 |
| ZrO$_2$ | 0 | 5 |
| La$_2$O$_3$ | 0 | 5 |
| P$_2$O$_5$ | 0 | 5 |
| F | 0 | 10 |
| Sb$_2$O$_3$ | 0 | 0.5 |
| As$_2$O$_3$ | 0 | <0.3 |
| SnO$_2$ | 0 | 0.5 |

The alumino-borosilicate glass provided according to the present invention may contain less than 0.3% by weight, such as at most 0.2% by weight or at most 0.1% by weight of each of the components Li$_2$O, MgO, CaO, SrO, TiO$_2$, ZrO$_2$, La$_2$O$_3$, P$_2$O$_5$, As$_2$O$_3$ and SnO$_2$, or is even free of these components.

In some embodiments, the alumino-borosilicate glass contains SiO$_2$ in a portion of 62.5 to 77.5% by weight, such as of 65 to 75% by weight or of 67.5 to 72.5% by weight.

In some embodiments, the alumino-borosilicate glass contains B$_2$O$_3$ in a portion of 7.5 to 25% by weight, such as of 10 to 20% by weight or of 12.5 to 17.5% by weight.

In some embodiments, the alumino-borosilicate glass contains Na$_2$O in a portion of 0.2 to 10% by weight, such as of 0.5 to 5% by weight or of 1 to 3% by weight.

In some embodiments, the alumino-borosilicate glass contains $K_2O$ in a portion of 2 to 17.5% by weight, such as of 5 to 15% by weight or of 10 to 14% by weight.

In some embodiments, the sum of the portions of the alkali metal oxides ($R_2O$) in the alumino-borosilicate glass is in a range of 2 to 25% by weight, such as of 5 to 20% by weight or of 10 to 15% by weight. In some embodiments, besides $Na_2O$ and/or $K_2O$ the glass does not contain further alkali metal oxides.

In some embodiments, the alumino-borosilicate glass contains BaO in a portion of 0.02 to 5% by weight, such as of 0.05 to 2% by weight or of 0.1 to 1% by weight.

In some embodiments, the alumino-borosilicate glass contains ZnO in a portion of 0.05 to 5% by weight, such as of 0.1 to 2% by weight or of 0.15 to 1% by weight.

In some embodiments, the alumino-borosilicate glass contains F in a portion of 0.1 to 5% by weight, such as of 0.2 to 2% by weight or of 0.5 to 1.5% by weight.

In some embodiments, the alumino-borosilicate glass contains $Sb_2O_3$ in a portion of 0.02 to 0.45% by weight, such as of 0.05 to 0.4% by weight or of 0.1 to 0.35% by weight.

Of particular relevance are the used refining agents as well as $CeO_2$ and $Fe_2O_3$, namely independently of the glass system used. Therefore, the following information is valid for all glass families.

In some embodiments, the glass is free of $CeO_2$ and $Fe_2O_3$. So, particularly low $Ext_0$ values can be achieved.

In some embodiments, the portion of $As_2O_3$ in the glasses provided according to the present invention is less than 0.3% by weight, such as at most 0.2% by weight or at most 0.1% by weight. Still further, in some embodiments, the glass is free of $As_2O_3$. So, particularly low $Ext_1$ values can be achieved.

In some embodiments, the portion of $Sb_2O_3$ in the glasses provided according to the present invention is at most 0.5% by weight, such as at most 0.4% by weight, at most 0.3% by weight, such as for example at most 0.2% by weight or at most 0.1% by weight. The glass even may be free of $Sb_2O_3$. So, particularly low $Ext_1$ values can be achieved.

In some embodiments, the portion of $SnO_2$ in the glasses provided according to the present invention is at most 0.5% by weight, such as at most 0.4% by weight, at most 0.3% by weight, such as for example at most 0.2% by weight or at most 0.1% by weight. The glass even may be free of $SnO_2$. So, particularly low $Ext_1$ values can be achieved.

In some embodiments, the portion of the sum of $As_2O_3$+$Sb_2O_3$+$SnO_2$ is at most 0.5% by weight, such as at most 0.4% by weight, at most 0.3% by weight, such as for example at most 0.2% by weight or at most 0.1% by weight. The glass even may be free of $As_2O_3$, $Sb_2O_3$ and $SnO_2$. So, particularly low $Ext_1$ values can be achieved.

The glass may contain F, for example in a portion of 0 to 45% by weight, such as 0.5 to 42.5% by weight or 5 to 40% by weight. So, particularly low $Ext_1$ values can be achieved.

The glass may also contain Cl, in particular due to Cl refining. In some embodiments, the portion is <2% by weight, such as <1.5% by weight or <1% by weight. When the portion of Cl is too high, then this may result in undesired salt precipitates on the glass.

When in this description is mentioned that the glasses are free of a component or that they do not contain a certain component, then this means that it is only allowed for this component to be present in the glasses as an impurity. This means that it is not added in substantial amounts. According to the present invention, not substantial amounts are amounts of less than 500 ppm, such as less than 300 ppm, less than 100 ppm, less than 50 ppm or less than 10 ppm, each on a weight basis.

In some embodiments, the beam guidance element is a lens, a light-guiding rod, a prism or an asphere.

The present invention also relates to a glass having a quality factor according to the present invention.

The present invention also relates to the use of an imaging system provided according to the present invention, in particularly in a projector, or in material processing.

The invention also relates to a projector comprising an imaging system provided according to the present invention, such as a DLP projector.

FIG. 1 shows schematically an exemplary embodiment provided according to the present invention. An exemplary design of the imaging system as DLP projector is shown. The three colors blue, green and red (arrow 5) generated by the laser light source(s) 1 after leaving the laser light source(s) 1 arrive at the beam guidance element 2. The beam guidance element 2 redirects the light to image-generating chips 3 (arrow 6). Then, the images generated by the image-generating chips 3 (such as one image each in blue, green and red) reach the beam guidance element 2. This is shown by the arrow 7. Then, the beam guidance element 2 ensures that a composite color image reaches the projection optics 4. This is shown by the arrow 8.

FIG. 2 shows the emission spectrum of the HOK 4/120 lamp from Phillips. On the x-axis the wavelength in nm is shown. On the y-axis the relative intensity in comparison to the maximum intensity is shown.

Figure 3:
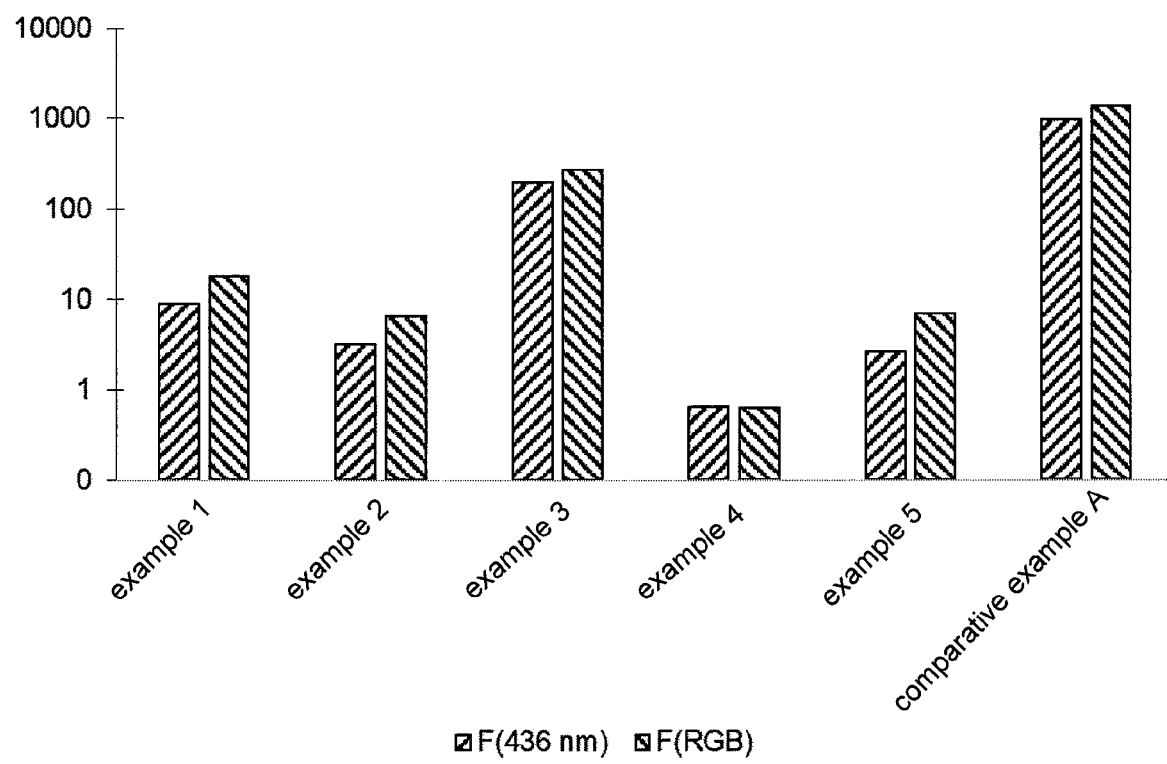
FIG. 3 is a bar diagram which illustrates a quality factor F(436 nm) and a quality factor F(RGB) for five examples 1 to 5 provided according to the present invention and for one comparative example A that is not provided according to the present invention.

FIG. 3 is a bar diagram which shows the quality factor F(436 nm) and the quality factor F(RGB) for five examples 1 to 5 provided according to the present invention and for one comparative example A that is not provided according to the present invention.

EXAMPLES

Samples of five example glasses 1 to 5 provided according to the present invention and of one comparative example A being not according to the present invention having a sample thickness of 10 mm were irradiated with a HOK 4 lamp for 15 hours each. A HOK 4/120 lamp from Philips was used. The spectrum of this HOK 4/120 lamp is shown in FIG. 2. The distance between the lamp and the sample was 7 cm. The power density was 25 $mW/cm^2$. The sample size was 20 mm×30 mm×10 mm. The compositions of the glasses are shown in the following Table 1 (in % by weight).

TABLE 1

|  | Ex. 1 | Ex. 2 | Ex. 3 | Ex. 4 | Ex. 5 | Comp. Ex. A |
|---|---|---|---|---|---|---|
| $SiO_2$ | 70 | 70 | 43 |  | 59 | 43 |
| $B_2O_3$ | 11 | 14 |  |  | 16 |  |
| $Al_2O_3$ |  | 1 |  | 17 |  |  |
| $Li_2O$ |  |  | 1 |  |  | 1 |
| $Na_2O$ | 10 | 1 | 5 |  |  | 5 |
| $K_2O$ | 7 | 12 | 3 |  | 18 | 4 |
| MgO |  |  |  | 2 |  |  |
| CaO | 0.2 |  |  | 11 |  |  |
| BaO | 1 | 0.2 | 10 | 14 |  | 9 |
| ZnO |  | 0.2 | 22 |  |  | 22 |
| SrO |  |  |  | 18 |  |  |
| $TiO_2$ | 0.1 |  |  |  |  |  |
| $ZrO_2$ |  |  | 5 |  |  | 5 |
| $La_2O_3$ |  |  |  | 11 |  | 11 |
| $P_2O_5$ |  |  |  | 9 |  |  |
| F | 0.3 | 1 |  | 3 | 1 | 7 |

TABLE 1-continued

|  | Ex. 1 | Ex. 2 | Ex. 3 | Ex. 4 | Ex. 5 | Comp. Ex. A |
|---|---|---|---|---|---|---|
| $Sb_2O_3$ |  | 0.3 |  |  | 0.018 |  |
| $As_2O_3$ |  |  |  |  |  | 0.3 |
| $SnO_2$ |  |  | 0.2 |  |  |  |

TABLE 2

|  | Ex. 1 | Ex. 2 | Ex. 3 | Ex. 4 | Ex. 5 | Comp. Ex. A |
|---|---|---|---|---|---|---|
| S(436 nm) [ppm/K] | 13.7 | 13.3 | 19.6 | 0.88 | 7.99 | 19.6 |
| S(546 nm) [ppm/K] | 12.9 | 12.6 | 18.0 | 0.20 | 7.16 | 18.0 |
| S(644 nm) [PPm/K] | 12.3 | 12.3 | 17.3 | −0.13 | 6.94 | 17.3 |
| $Ext_0$(436 nm) [1/cm] | 0.0016 | 0.0010 | 0.0013 | 0.0036 | 0.0016 | 0.0013 |
| $Ext_0$(546 nm) [1/cm] | 0.0008 | 0.0009 | 0.0004 | 0.0020 | 0.0020 | 0.0004 |
| $Ext_0$(644 nm) [1/cm] | 0.0012 | 0.0010 | 0.0006 | 0.0024 | 0.0022 | 0.0006 |
| $Ext_1$(436 nm) [1/cm] | 0.0056 | 0.0022 | 0.0817 | 0.0020 | 0.0015 | 0.4038 |
| $Ext_1$(546 nm) [1/cm] | 0.0029 | 0.0014 | 0.0219 | 0.0010 | 0.0001 | 0.1349 |
| $Ext_1$(644 nm) [1/cm] | 0.0030 | 0.0002 | 0.0114 | 0.0013 | 0.0012 | 0.0552 |
| k [W/(cm*K)] | 0.011 | 0.013 | 0.0083 | 0.0076 | 0.0093 | 0.0083 |
| F(436 nm) [ppm/W] | 8.86 | 3.20 | 196.34 | 0.658 | 2.697 | 958.65 |
| F(546 nm) [ppm/W] | 4.33 | 2.20 | 48.44 | 0.078 | 1.631 | 294.33 |
| F(644 nm) [ppm/W] | 4.71 | 1.11 | 24.92 | −0.063 | 2.543 | 116.38 |
| F(RGB) [ppm/W] | 17.9 | 6.5 | 270 | 0.674 | 6.9 | 1369 |

The quality factor F(436 nm), the quality factor F(546 nm), the quality factor F(644 nm) and the quality factor F (RGB) were calculated according to the above given formulas. For that the respective values of the thermality S, the not-induced absorbance $Ext_0$ and the induced absorbance $Ext_1$ for the wavelengths 436 nm, 546 nm and 644 nm as well as the thermal conductivity k of the glass were determined. The results are shown in FIG. 3. The following Table 2 summarizes the measuring values and calculations.

It can be seen that the glasses 1 to 5 provided according to the present invention in contrast to the comparative example A have a quality factor F(436 nm)<700 ppm/W, a quality factor F(546 nm)<215 ppm/W, a quality factor F(644 nm)<85 ppm/W and a quality factor F(RGB)<1000 ppm/W.

The example glass 3 and the comparative example A have very similar compositions, and the essential difference between them is that the comparative example A contains a relevant portion of $As_2O_3$. As a result, a performance of example 3 which is improved many times is shown. Remarkably, the effect can be achieved with glasses of many different glass families. So, the examples 1 and 5 are borosilicate glasses, the example 2 is an alumino-borosilicate glass, the example 3 is a silicate glass and the example 4 is a fluorophosphate glass.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE SIGNS 1 laser light source(s)
2 beam guidance element
3 image-generating chips
4 projection optics
5 light from the laser light source(s) arrives at the beam guidance element
6 light from the beam guidance element is redirected to the image-generating chips
7 the images generated by the image-generating chips reach the beam guidance element
8 a composite color image reaches the projection optics

What is claimed is:

1. An imaging system, comprising:
at least one laser light source selected from the group consisting of a laser light source B having a wavelength $\lambda_B$ in the spectral range of 380 nm to 490 nm, a laser light source G having a wavelength $\lambda_G$ in the spectral range of >490 nm to 585 nm, and a laser light source R having a wavelength $\lambda_R$ in the spectral range of >585 nm to 750 nm; and
a beam guidance element, wherein the laser light source is suitable to generate in at least one point of the beam guidance element a mean surface power density of more than 10 W/cm², and the beam guidance element consists of a glass having a quality factor F(436 nm)=S (436 nm)*($Ext_0$(436 nm)+$Ext_1$(436 nm))/k, wherein S(436 nm) is a thermality at a wavelength of 436 nm, $Ext_1$(436 nm) is an additional absorbance in comparison to $Ext_0$(436 nm) at a wavelength of 436 nm of a sample having a thickness of 10 mm after an irradiation of 15 hours with a HOK 4 lamp, $Ext_0$(436 nm) is an absorbance at a wavelength of 436 nm of a sample having a thickness of 10 mm without irradiation with a HOK 4 lamp, and k is a thermal conductivity, and wherein F(436 nm) is <700 ppm/W.

2. The imaging system of claim 1, comprising a laser light source B having a wavelength $\lambda_B$ in the spectral range of 380 nm to 490 nm, a laser light source G having a wavelength $\lambda_G$ in the spectral range of >490 nm to 585 nm and a laser light source R having a wavelength $\lambda_R$ in the spectral range of >585 nm to 750 nm, wherein the laser light source B, the laser light source G and the laser light source R are suitable to generate in at least one point of the beam guidance element a mean surface power density of more than 10 W/cm$^2$, and the beam guidance element consists of a glass having a quality factor F(RGB)=F(436 nm)+F(546 nm)+F(644 nm)=S(436 nm)*($Ext_0$(436 nm)+$Ext_1$(436 nm))/k +S(546 nm)*($Ext_0$(546 nm)+$Ext_1$(546 nm))/k+S(644 nm)*($Ext_0$(644 nm)+$Ext_1$(644 nm))/k, wherein F(RGB) is <1000 ppm/W.

3. The imaging system of claim 2, wherein F(RGB) is at most 800 ppm/W.

4. The imaging system of claim 1, wherein the at least one laser light source is a diode laser.

5. The imaging system of claim 1, wherein the beam guidance element is a prism.

6. The imaging system of claim 1, wherein the at least one laser light source is suitable to generate in at least one point of the beam guidance element a mean surface power density of 15 W/cm$^2$ to 60 W/cm$^2$.

7. The imaging system of claim 1, wherein S(436 nm), S(546 nm) and S(644 nm) are at most 50 ppm/K.

8. The imaging system of claim 1, wherein $Ext_0$(436 nm), $Ext_0$(546 nm) and $Ext_0$(644 nm) are less than 0.01/cm.

9. The imaging system of claim 1, wherein $Ext_1$(436 nm), $Ext_1$(546 nm) and $Ext_1$(644 nm) are less than 0.3/cm.

10. The imaging system of claim 1, wherein the thermal conductivity k is higher than 0.005 W/(cm*K).

11. The imaging system of claim 1, wherein a mean do/dT at a wavelength of at least one of 436 nm, 546 nm, or 644 nm in a temperature range of 20° C. to 40° C. is in a range of 0.1 to 8.0 ppm/K.

12. A beam guidance element, consisting of a glass having a quality factor F(436 nm)=S(436 nm)*($Ext_0$(436 nm)+$Ext_1$(436 nm))/k, wherein S(436 nm) is a thermality at a wavelength of 436 nm, $Ext_1$(436 nm) is an additional absorbance in comparison to $Ext_0$(436 nm) at a wavelength of 436 nm of a sample having a thickness of 10 mm after an irradiation of 15 hours with a HOK 4 lamp, $Ext_0$(436 nm) is an absorbance at a wavelength of 436 nm of a sample having a thickness of 10 mm without irradiation with a HOK 4 lamp, and k is a thermal conductivity, wherein F(436 nm) is <700 ppm/W.

13. A glass having a quality factor F(436 nm)=S(436 nm)*($Ext_0$(436 nm)+$Ext_1$(436 nm))/k, wherein S(436 nm) is a thermality at a wavelength of 436 nm, $Ext_1$(436 nm) is an additional absorbance in comparison to $Ext_0$(436 nm) at a wavelength of 436 nm of a sample having a thickness of 10 mm after an irradiation of 15 hours with a HOK 4 lamp, $Ext_0$(436 nm) is an absorbance at a wavelength of 436 nm of a sample having a thickness of 10 mm without irradiation with a HOK 4 lamp, and k is a thermal conductivity, wherein F(436 nm) is <700 ppm/W.

14. A projector, comprising:
  an imaging system comprising:
    at least one laser light source selected from the group consisting of a laser light source B having a wavelength in the spectral range of 380 nm to 490 nm, a laser light source G having a wavelength $\lambda_G$ in the spectral range of >490 nm to 585 nm, and a laser light source R having a wavelength $\lambda_R$ in the spectral range of >585 nm to 750 nm; and
  a beam guidance element, wherein the laser light source is suitable to generate in at least one point of the beam guidance element a mean surface power density of more than 10 W/cm$^2$, and the beam guidance element consists of a glass having a quality factor F(436 nm)=S (436 nm)*($Ext_0$(436 nm)+$Ext_1$(436 nm))/k, wherein S(436 nm) is a thermality at a wavelength of 436 nm, $Ext_1$(436 nm) is an additional absorbance in comparison to $Ext_0$(436 nm) at a wavelength of 436 nm of a sample having a thickness of 10 mm after an irradiation of 15 hours with a HOK 4 lamp, $Ext_0$(436 nm) is an absorbance at a wavelength of 436 nm of a sample having a thickness of 10 mm without irradiation with a HOK 4 lamp, and k is a thermal conductivity, and wherein F(436 nm) is <700 ppm/W.

* * * * *